United States Patent [19]

Priem

[11] Patent Number: 5,003,497
[45] Date of Patent: Mar. 26, 1991

[54] METHOD FOR THREE-DIMENSIONAL CLIP CHECKING FOR COMPUTER GRAPHICS

[75] Inventor: Curtis Priem, Fremont, Calif.

[73] Assignee: Sun Micosystems Inc, Mountain View, Calif.

[21] Appl. No.: 284,942

[22] Filed: Dec. 15, 1988

[51] Int. Cl.$^5$ .............................................. G06F 15/20
[52] U.S. Cl. .................................. 364/522; 340/729; 382/45; 364/521
[58] Field of Search ....................... 364/518, 521, 522; 340/721, 723, 727, 729, 730; 382/44–48

[56] References Cited

U.S. PATENT DOCUMENTS

| | | | |
|---|---|---|---|
| 4,475,104 | 10/1984 | Shen | 340/729 |
| 4,570,181 | 2/1986 | Yamamura | 382/48 X |
| 4,766,556 | 8/1988 | Arakawa | 364/522 |
| 4,811,241 | 3/1989 | Liang | 364/518 |
| 4,821,209 | 4/1989 | Hempel et al. | 340/750 X |
| 4,821,210 | 4/1989 | Rumbaugh | 364/518 |

OTHER PUBLICATIONS

Newman & Sproull, *Principles of Interactive Computer Graphics*, 2d. Edition, 1979, pp. 355–366.
Foley & Van Dam, *Fundamentals of Interactive Computer Graphics*, 1984, pp. 267–318.
Clipping Using Homogeneous Coordinates, James F. Blinn and Martin E. Newell; Computer Graphics, vol. 12, No. 3, Aug. 1978.

*Primary Examiner*—Gary V. Harkcom
*Assistant Examiner*—H. R. Herndon
*Attorney, Agent, or Firm*—Blakely, Sokoloff, Taylor & Zafman

[57] ABSTRACT

A method for clip checking three dimensional images for display on a computer display system. The display system includes a computer having a central processing unit(CPU) coupled to a memory and a cathode ray tube (CRT) display. The method of the present invention includes inputting a plurality of points comprising an image to be displayed, wherein each of the points is described by X,Y,Z and W world coordinates. The points are stored in the memory coupled to the CPU. The CPU executes a viewing algorithm which transforms the world coordinates for each point into view reference coordinates. The view reference coordinates have an origin at the viewpoint of the user, with the Z axis pointed outward in the direction of the display screen. Each of the points of the image are described by clipping bits X Right, X Left, Y Top, Y Bottom, Z Back, and Z Front. The view reference coordinate system permits the user to selectively enable/disable clipping quadrants in X,Y,Z and W space. The present invention determines the value of the clipping bits for all of the points (vertices) comprising the image. Using predefined combinational logic, the clipping bits are evaluated and the logic determines if the image is visible, hidden, or if it intersects at least one clipping plane. The method provides an efficient means for determining if a three dimensional image is to be displayed on a computer display system.

6 Claims, 10 Drawing Sheets

1. IF W ≥ 0:

THEN:   IF CLIP RIGHT "ON" AND W < X
           THEN X RIGHT = 1:

IF CLIP LEFT "ON" AND X < -W
           THEN X LEFT = 1

ELSE:

IF CLIP RIGHT "OFF" OR W ≤ X
               THEN X RIGHT = 1;

IF CLIP LEFT "OFF" OR X ≤ -W
               THEN X LEFT = 1

2. IF W ≥ 0:

THEN:   IF CLIP TOP "ON" AND W < Y
               Y TOP = 1

IF CLIP BOTTOM "ON" AND Y < -W
               Y BOTTOM = 1

ELSE:

IF CLIP TOP "OFF" OR W ≤ Y
               THEN Y TOP = 1

IF CLIP BOTTOM "OFF" OR Y ≤ -W
               THEN Y BOTTOM = 1

3. IF W ≥ 0:

THEN:   IF CLIP BACK "ON" AND W < Z
               THEN Z BACK = 1

IF CLIP FRONT "ON" AND Z < 0
               THEN Z FRONT = 1

ELSE:

IF CLIP BACK "OFF" OR W ≤ Z
               THEN Z BACK = 1

IF CLIP FRONT "OFF" OR Z ≤ 0
               THEN Z FRONT = 1

*Fig. 9*

IF ALL THE CLIPPING BITS ARE = 0 FOR EVERY VERTICE
THEN THE OBJECT IS VISIBLE

IF ALL THE CLIPPING BITS ARE = 1 FOR EVERY VERTICE,
THEN THE OBJECT IS VISIBLE

IF ALL THE X LEFT BITS = 0 AND ALL THE X RIGHT BITS = 1
FOR EVERY VERTICE, THEN THE OBJECT IS HIDDEN

IF ALL X LEFT BITS = 1 AND ALL X RIGHT BITS = 0 FOR EVERY
VERTICE, THEN THE OBJECT IS HIDDEN

IF ALL Y BOTTOM BITS = 0 AND ALL Y TOP BITS = 1 FOR
EVERY VERTICE, THEN THE OBJECT IS HIDDEN

IF ALL Y BOTTOM BITS = 1 AND ALL Y TOP BITS = 0 FOR
EVERY VERTICE, THEN THE OBJECT IS HIDDEN

IF ALL Z FRONT BITS = 0 AND ALL Z BACK BITS = 1 FOR
EVERY VERTICE, THEN THE OBJECT IS HIDDEN

IF ALL Z FRONT BITS = 1 AND ALL Z BACK BITS = 0 FOR
EVERY VERTICE, THEN THE OBJECT IS HIDDEN

IF NONE OF THE ABOVE ARE TRUE THEN THE OBJECT
INTERSECTS AT LEAST ONE CLIPPING PLANE

*Fig. 10*

METHOD FOR THREE-DIMENSIONAL CLIP CHECKING FOR COMPUTER GRAPHICS

BACKGROUND OF THE INVENTION

1. Field of the Invention

The present invention relates to methods for displaying graphic information. In particular, the present invention relates to methods for clipping three dimensional images for display on a two dimensional cathode ray tube display.

2. Art Background

One of the most common and natural means of communicating with a computer is through graphic representations of data displayed on a cathode ray tube (CRT) display. Humans interact readily in terms of images, and a person is able to absorb or manipulate information presented in a visual context much faster than if it is represented simply by text. Over the past two decades, a variety of computer graphic systems have been developed to display objects as two and three dimensional images on what is, by definition, a two dimensional CRT display screen. Computer generated images may represent data, real or imagined objects, and may synthesize combinations of images into scenes and pictures. In addition, computer generated graphics provide an excellent means to visualize time varying phenomena such as the deflection of an aircraft wing in supersonic flight, or the development of a galaxy over time in intergalactic space.

One of the most challenging uses of a computer display system is the generation, manipulation and display of three dimensional objects portrayed on the two dimensional display screen. Each point comprising an object in three dimensional space is described by X, Y, Z and W coordinates. See, J. D. Foley, A. Van Dam, "Fundamentals of Interactive Computer Graphics", (Addison Wesley, July 1984). It is well known that objects described with reference to X, Y, Z and W coordinates must be transformed to different viewing parameters on the display. A point comprising an image must be transformed from a world coordinate system of X, Y, Z into a view reference coordinate system which has its origin fixed at the view point of the user, and its Z axis pointed in the direction of the display screen. Typically, the world coordinates are passed through modeling and viewing transforms prior to being clipped. A perspective divide step is then completed which places the images to be displayed into a "viewing pyramid". The view reference coordinate system may, therefore, be considered to be the coordinate system after the modeling and viewing transforms have been accomplished. A variety of techniques have been developed to convert points in the world coordinate system to the view reference coordinate system for display. See, Newman, Sproull, "Fundamentals of Interactive Computer Graphics", (McGraw-Hill, 1979).

However, after the points comprising the image have been transformed by the modeling and viewing transformations, three dimensional clipping must be accomplished to insure that objects do not exceed the prescribed limits of the view. The view port comprises a viewing pyramid defining that portion of the view reference coordinate space which the viewer can actually see on the display. Historically, certain types of objects have presented problems during three dimensional clipping. Examples of problem areas include curves, lines which intersect an W=0 space, or objects which intersect one of the clipping planes which define the viewing pyramid in the view reference coordinate system. A number of methods have been developed for clipping homogeneous coordinates, including the method described by Blinn in "Clipping Using Homogeneous Coordinates", Computer Graphics, Vol. 12, No. 3, August 1978.

The problem of clipping certain types of three dimensional images has resulted in degraded display system performance and efficiency. As will be described, the present invention provides a method for defining clipping planes and achieving three dimensional clipping for any type of image to be displayed, including curves, discontinuous line segments, as well as front and back clipping to achieve proper perspective views.

SUMMARY OF THE INVENTION

A method for clip checking three dimensional objects for display on a computer display system is disclosed. The display system includes a computer having a central processing unit (CPU) coupled to a memory and a cathode ray tube (CRT) display. The method of the present invention includes inputting a plurality of points comprising an object to be displayed, wherein each of the points is described by X, Y, Z and W world coordinates. The points are stored in the memory coupled to the CPU. The CPU executes a viewing algorithm which transforms the world coordinates for each point into view reference coordinates. The view reference coordinates have an origin at the viewpoint of the user, with the Z axis pointed outward in the direction of the display screen. Each of the points of the object are described by clipping bits X Right, X Left, Y Top, Y Bottom, Z Back, and Z Front. The view reference coordinate system of the present invention permits the user to selectively enable/disable clipping quadrants in X, Y, Z and W space. The present invention determines the value of the clipping bits for all the points (vertices) comprising the image. Using a predefined IF/THEN logic sequence, the present invention evaluates the clipping bits and determines if the object is visible, hidden, or if it intersects at least one clipping plane. In the event that the object is completely hidden then the CPU does not render it on the display. Conversely, if the object is fully visible then the entire image is rendered and displayed. If the image intersects at least one enabled clipping plane, then the CPU executes one of a variety of known clipping algorithms to determine what portion of the object is visible and proceeds to display only such visible portion. The method of the present invention provides an efficient means for determining if a three dimensional object is to be displayed on a computer display system.

BRIEF DESCRIPTION OF THE DRAWINGS

FIG. 9 illustrates the IF/THEN/ELSE logical sequence of steps executed by the present invention to determine the value of the clipping bits.

FIG. 10 illustrates the IF/THEN logic sequence of the present invention to determine if an image is hidden, visible, or if it intersects at least one clipping plane.

NOTATION AND NOMENCLATURE

Figure 1:
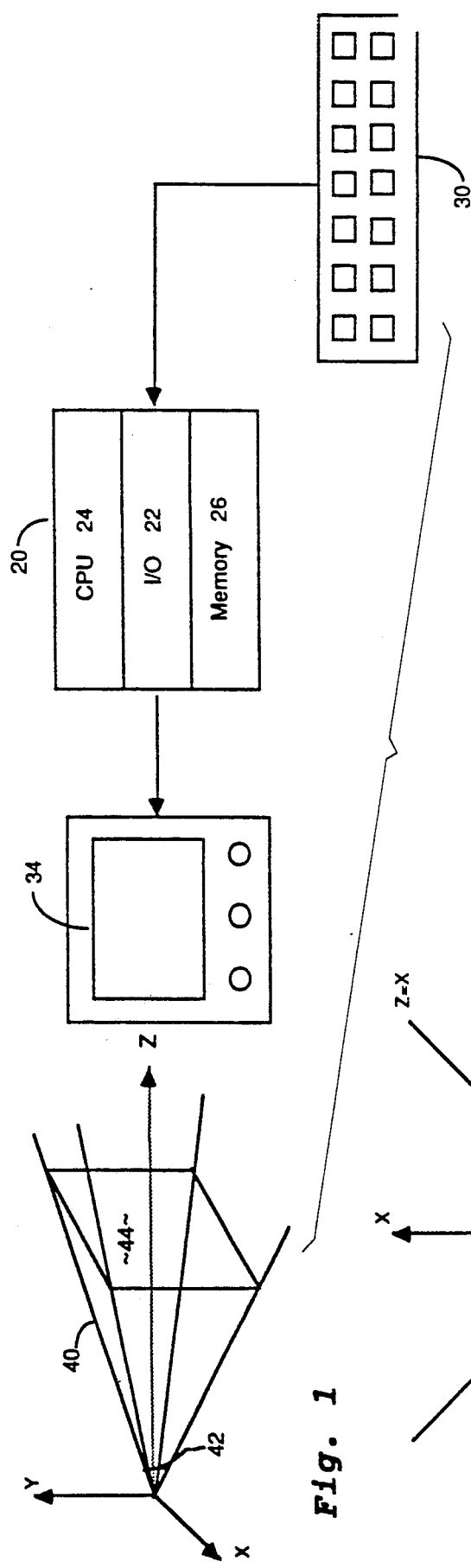
FIG. 1 illustrates a computer display system incorporating the teachings of the present invention and an example of a viewing pyramid.

The detailed descriptions which follow are presented largely in terms of algorithms and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signal as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention. In the present case, the operations are machine operations. Useful machines for performing the operations of the present invention include general purpose digital computers or other similar devices. In all cases there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below.

DETAILED DESCRIPTION OF THE INVENTION

In the following description, numerous details are set forth such as specific coordinates, coordinate systems, clipping planes, inequalities, etc. in order to provide a thorough understanding of the present invention. However, it will be apparent to one skilled in the art that the present invention may be practiced without these specific details. In other instances, well known circuits and structures are illustrated in block diagram form and not described in detail in order not to obscure the present invention unnecessarily.

Referring now to FIG. 1, a typical computer display system is illustrated which incorporates the teachings of the present invention. Shown there is a computer 20 which comprises three major components. The first of these is an input/output (I/O) circuit 22 which is used to communicate information and appropriately structured form to and from other parts of the computer 20. Also shown as part of computer 20 is a central processing unit (CPU) 24 and memory 26. These latter two elements are those typically found in most general purpose computers and almost all special purpose computers. In fact, several elements contained within computer 20 are intended to be representative of this broad category of data processors. Particular examples of suitable data processors to fill the role of computer 20 include machines manufactured by Sun Microsystems, Inc. located in Mountain View, Calif. Other computers having like capabilities may be, of course, adapted in a straight forward manner to perform the several functions described below.

Also shown in FIG. 1 is an input device 30 shown in typical embodiment as a keyboard. It should be understood, however, that the input device may actually be a card reader, magnetic or paper tape reader, or other well known input device (including, of course, another computer). A display monitor 34 is illustrated which is used to display the images generated in accordance with the teachings of the present invention. Such a display monitor may take the form of any of several well known varieties of CRT displays. Typically, memory 26 includes a video destination bit map in which each bit in the destination bit map corresponds to the coordinate of a corresponding pixel of the display monitor 34. Thus, the destination bit map can be described by a two dimensional array of points having known coordinates. Memory 26 further includes programs which represent a variety of sequences and instructions for execution by the CPU. For example, the control program implementing the operations and routines described herein, monitor and disk operating instructions and the like may be stored within memory 26.

Also shown in FIG. 1, is a viewing pyramid denoted generally by the numeral 40, in which the viewer's eye 42 forms the apex of the pyramid with the base, denoted by the numeral 44, corresponding to the surface of the CRT of display 34. Images disposed within the viewing pyramid 40 are visible to the user's eye 42, and therefore are displayed. Correspondingly, points of images falling outside of the viewing pyramid 40 are not visible to the user's eye and are therefore not displayed, in accordance with the method of the present invention.

Figure 2:
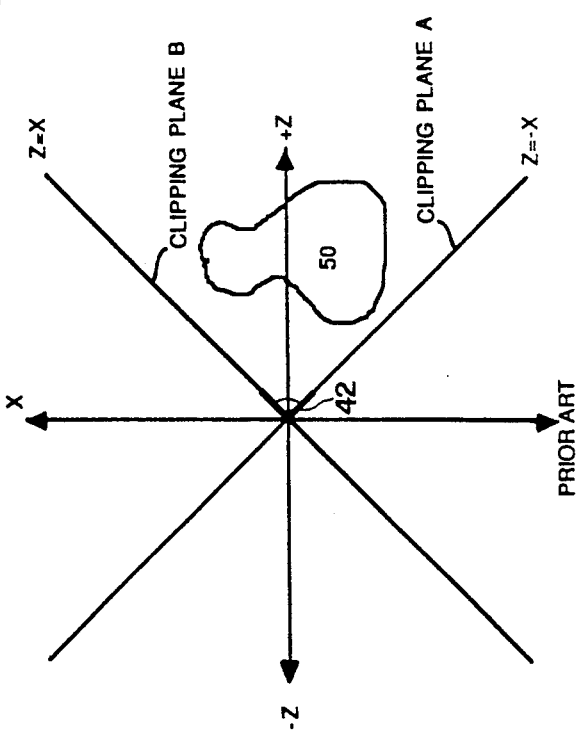
FIG. 2 is a graphical illustration of a prior art three dimensional clipping technique.

Referring now to FIG. 2, a prior art method for clipping three dimensional images is illustrated graphically.

Figure 3:
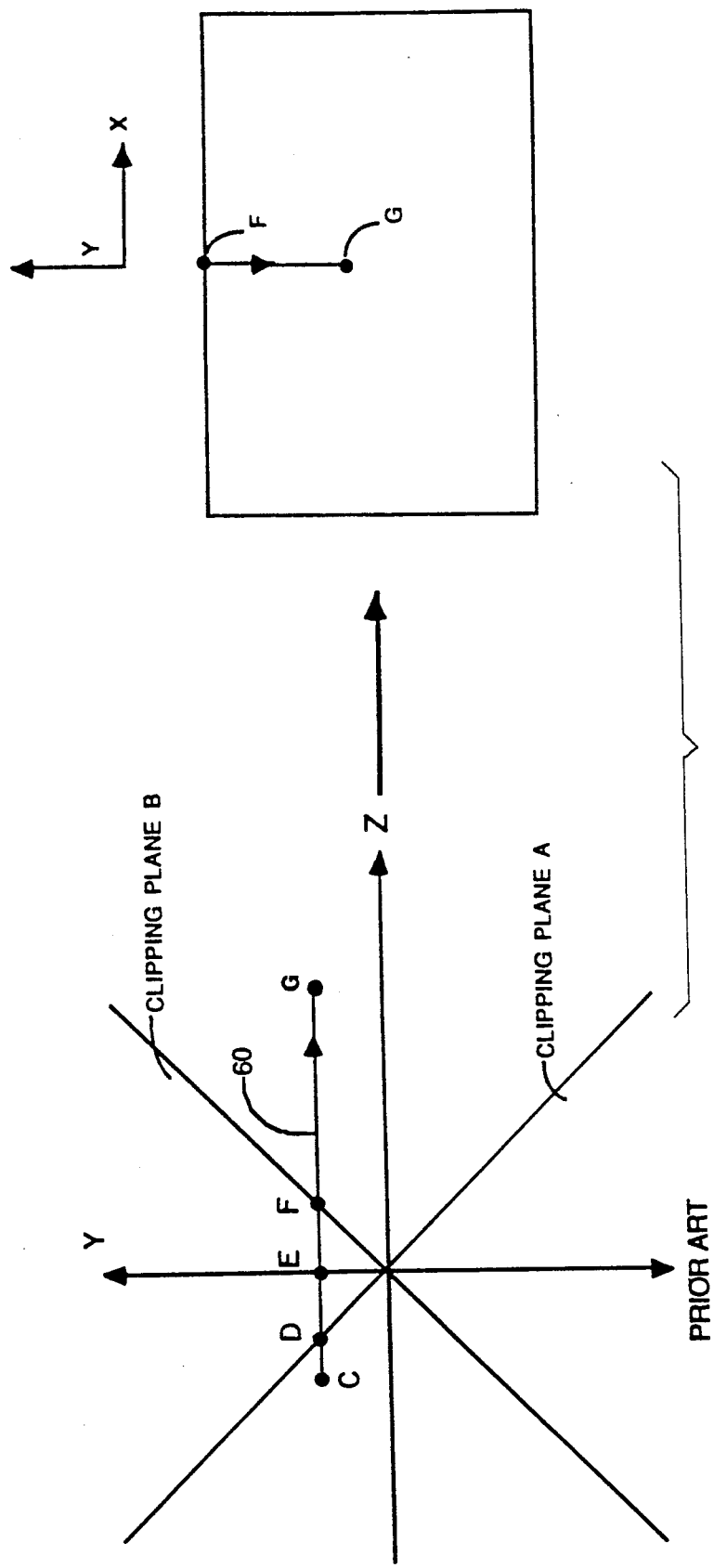
FIG. 3 graphically illustrates the prior art technique of FIG. 2 with respect to clipping a line segment crossing the Z axis.

As shown, an image 50 is comprised of a plurality of points falling along curved surfaces, each of the points having X, Y, Z and W coordinates. Clipping planes A and B are established which define the viewing pyramid from the user's eye 42 corresponding to points which are visible to a user viewing display 34. In the example of FIG. 2, all points having values of $X>Z$ or $X<-Z$ are not displayed. A problem in such prior art clipping methods occurs, for example, if a line (such as line 60 in FIG. 3) crosses the Z (or W)=0 plane. In accordance with the prior art, the line passing through points C to G in FIG. 3 will be clipped from point C to point F by clipping planes A and B. It will be appreciated that only the line segment from point F to G will be displayed, and that all other portions of the line 60 will be clipped. However, in four dimensional space the segment from point C to point D should be displayed. Moreover, at the point where line 60 crosses the z=0 plane (point E), the line is not defined and the screen coordinate goes to infinity, thereby resulting in a discontinuity of the line. As shown in the figure adjacent to the graph of FIG. 3, a viewer would observe only segment FG of line 60, and segment CD would be improperly clipped. In addition, the generation of hyperbolas or other curved surfaces presents other problems associated with three dimensional clipping, as is well known in the art, in which the simple use of clipping planes does not provide satisfactory results.

Figure 4:
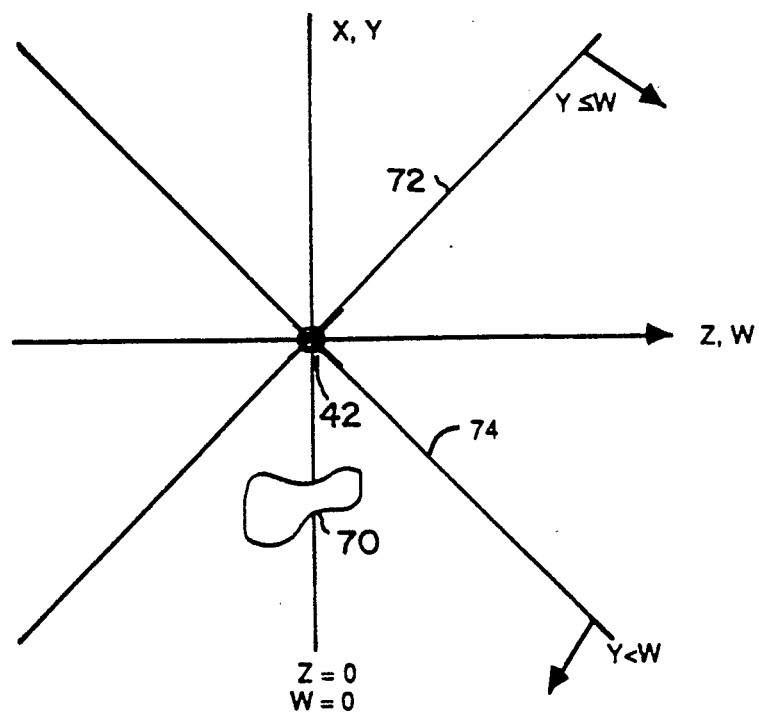
FIG. 4 illustrates an image crossing the Z=0, W=0 axis which is entirely disposed within a clipping plane.
Figure 5A:
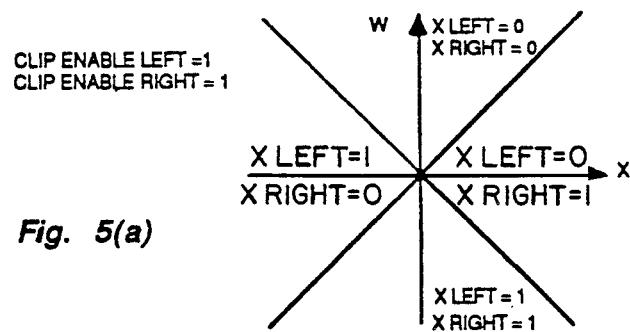
FIGS. 5a–5l illustrate the present invention's selective enabling/disabling of clipping planes.
Figure 5B:
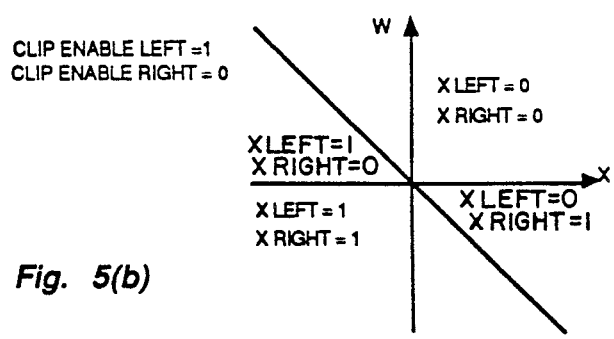
Figure 5C:
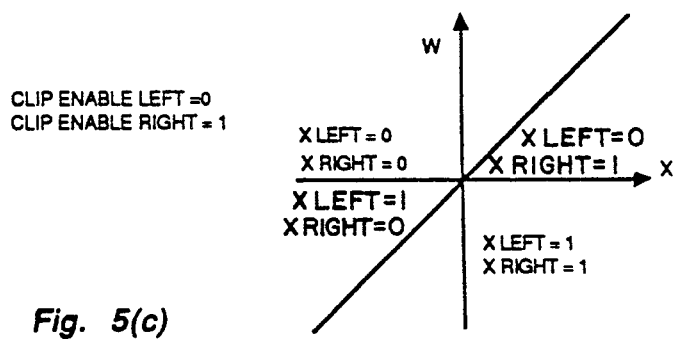
Figure 5D:
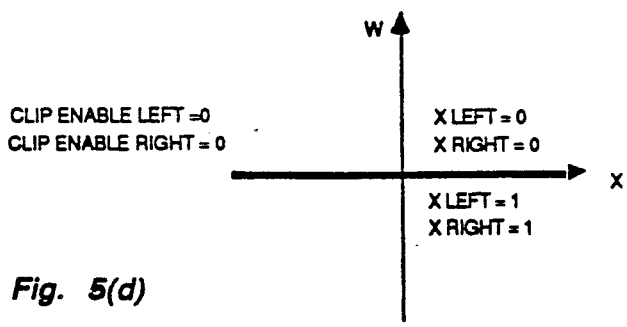
Figure 5E:
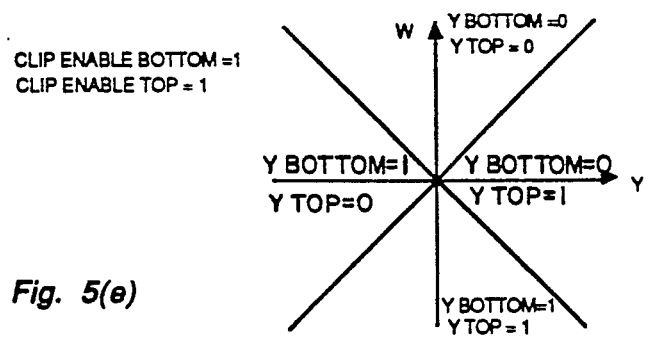
Figure 5F:
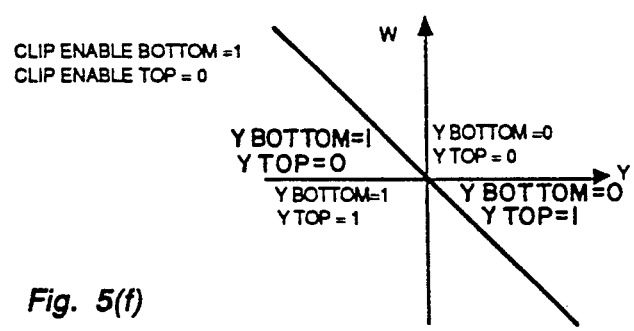
Figure 5G:
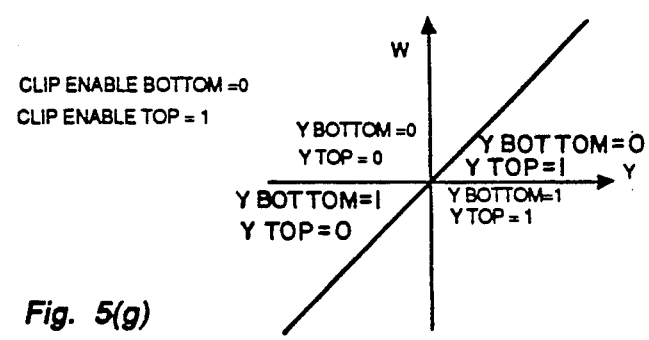
Figure 5H:
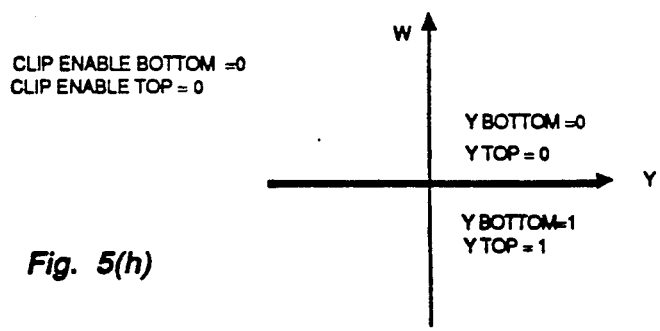
Figure 5I:
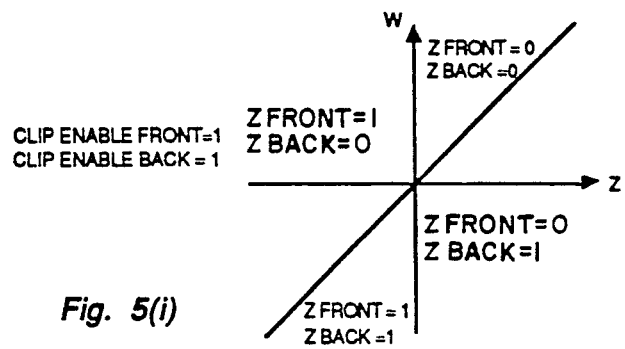
Figure 5J:
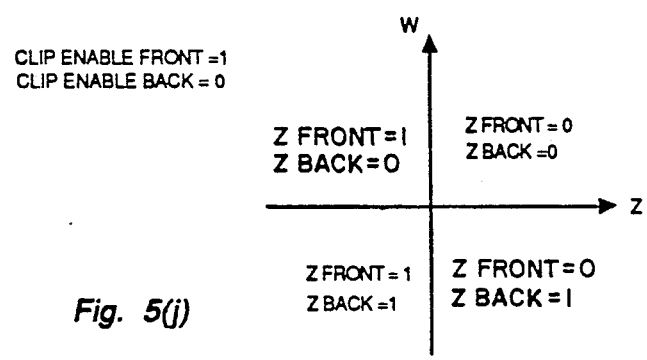
Figure 5K:
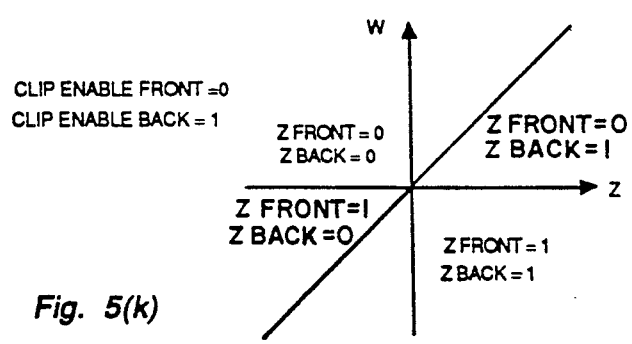
Figure 5L:
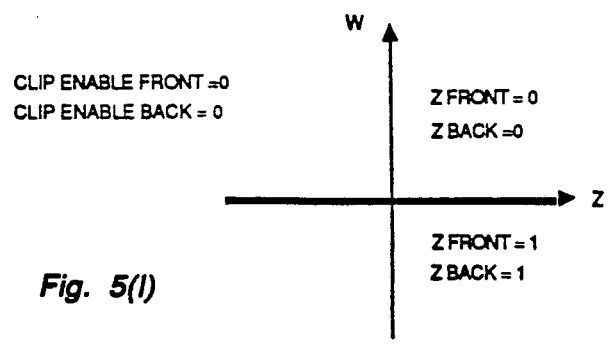

Referring now to FIG. 4, certain methods of clipping using homogeneous coordinates have been proposed to transform and represent objects. One such system is described by Blinn and Newell in "Clipping Using Homogeneous Coordinates", Computer Graphics, Vol. 12, No. 3, August 1978. Although the Blinn method overcomes problems associated with curve transformations described in prior art clipping plane systems, any object which crosses the Z (or W)=0 plane must be handled as two separate objects. Thus, an image, for example of an aircraft, which crosses the Z=0 plane results in a portion of the object disposed in front of the viewer's eye 42, and a portion of the object being in back of the viewer. FIG. 4 graphically represents this condition and illustrates an object 70 crossing the Z=0 plane. Blinn then applies separate clipping rules for each portion of the object which is split by the planes. Accordingly, the Blinn method requires that the display system clip a portion of object 70 in the positive Z direction, and then make a separate determination regarding that portion of the object 70 which is located in the negative Z direction. It will be appreciated to one skilled in the art in reviewing FIG. 4, that the entire object 70 is hidden since it falls within the intersection of the clipping planes referred to by the numerals 72 and 74. Accordingly, the Blinn method is redundant and wasteful since it requires that the object 70 be split and analyzed in accordance with separate rules whilst the entire object 70 should be recognized as not being visible since it falls within the intersection of the clipping planes. It will be appreciated that although the Blinn method describes techniques which obviate problems associated with clipping curves and the like as previously noted relative to FIGS. 2 and 3, that Blinn is highly inefficient with respect to objects which are not visible because they are disposed to the right or to the left, or above or below the viewer's eye 42.

The present invention permits the selective enabling of clipping bits which results in selected clipping within desired quadrants, as illustrated in FIGS. 5a–5l. Each quadrant may be selectively enabled or disabled through the control of the clipping bits, as will be described. The present invention provides an efficient method for trivially rejecting object images disposed outside of the viewing pyramid while still be capable of handling complex rational parametric curves.

As illustrated in FIG. 5, the shaded portions of each figure identify those quadrants in which objects disposed therein are not visible and therefore are not displayed. The system of the present invention permits the selective enabling/disabling of clipping quadrants such that the combinations of clipping quadrants illustrated in FIG. 5 may be achieved. It will be appreciated that all clipping may be effectively turned "off" by disabling clipping bits in all six quadrants. Similarly, quadrants, or combinations thereof, may be selectively turned "on" such that clipping is achieved in all but one or two selected quadrants. Also illustrated in the figure, for each quadrant, are the bit settings for X Left, X Right, Z Back, Z Front, Y Top, and Y Bottom which result in the desired clipping shown. The determination of whether an object is visible, hidden or if it intersects at least one of the clipping planes illustrated in FIG. 5 is described below.

Figure 6:
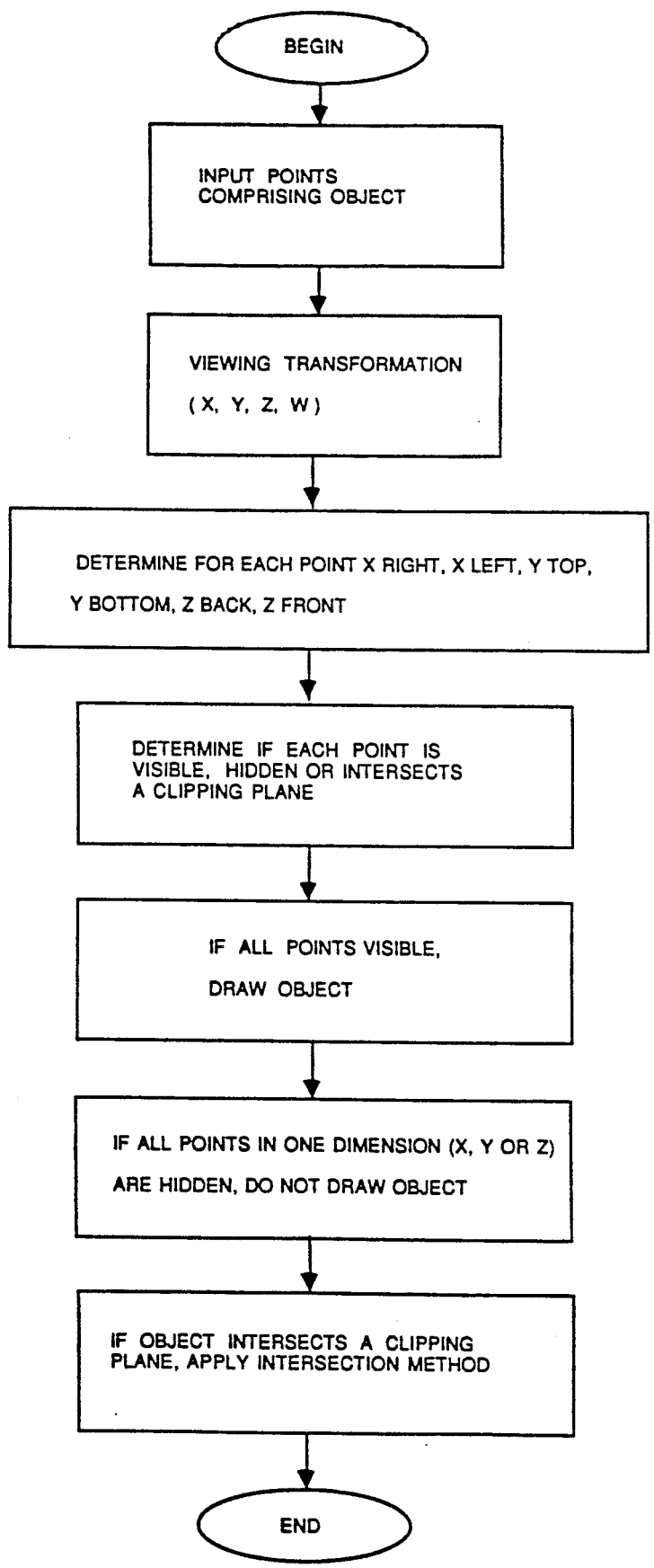
FIG. 6 illustrates the sequence of steps utilized by the present invention to determine if all points comprising an object are visible, hidden or if at least some of the points intersect a clipping plane.

Referring now to FIG. 6, the present invention's method inputs all points comprising an object into memory 26 of computer 20. CPU 24, executing one of a variety of viewing transformation programs, generates X, Y, Z and W coordinates for the inputted points comprising the object to be displayed. CPU 24 further executes a three dimensional transformation which converts the world coordinates of X, Y, Z and W into the view coordinate system. In particular, CPU 24 determines the value of the clipping bits identified as, X Right, X Front, Y Top, Y Bottom, Z Back, and Z Front, for each vertice of the object to be displayed. The method of the present invention then determines from the clip bits of each vertice if each object is visible, hidden or intersects a clipping plane using the IF/THEN logic sequence of FIG. 10. If all points comprising the object are visible, then CPU 24 renders the object using an appropriate rendering algorithm on CRT 34. Alternatively, if all points are hidden in just one dimension (X, Y or Z), then the CPU 24 does not render the object at all. If the object intersects a clipping plane, then an appropriate clipping algorithm such as mid point subdivision or adaptive clip box is applied.

Figure 7:
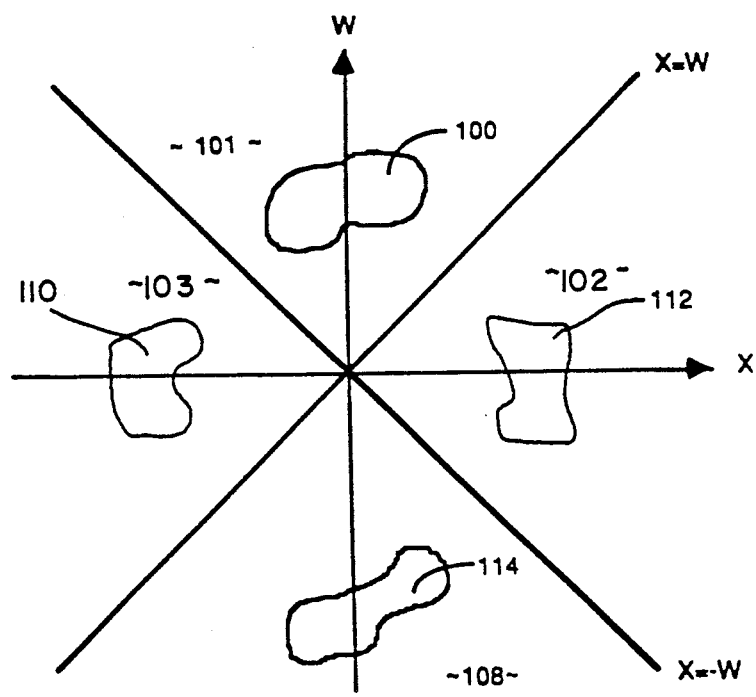
FIG. 7 illustrates the present invention's use of selectively enabled clipping planes to determine if an object is disposed entirely within the clipping plane, thereby obviating the need for execution of a clipping algorithm.

Referring now to FIG. 7, assume for sake of example that object 100 comprises points which are disposed in the quadrant 101. Assume further that clipping bits X Right and X Left have been enabled. Objects 110 and 112 fall within the clipping quadrants and, as will be described, are dismissed trivially such that they need not be split in accordance with the methodology of Blinn, and are simply not displayed by CPU 24. Similarly, object 114 which falls in the quadrant 108 of FIG. 7 would be displayed, as would object 100, since neither fall within a clipping quadrant.

Accordingly, as will be appreciated, the present invention permits the rapid identification of those objects disposed entirely within enabled clipping quadrants (for example, quadrants 102 and 103) in FIG. 7 and thereby saves significant time in unnecessary computing effort to split the object and apply the method of Blinn.

Figure 8:
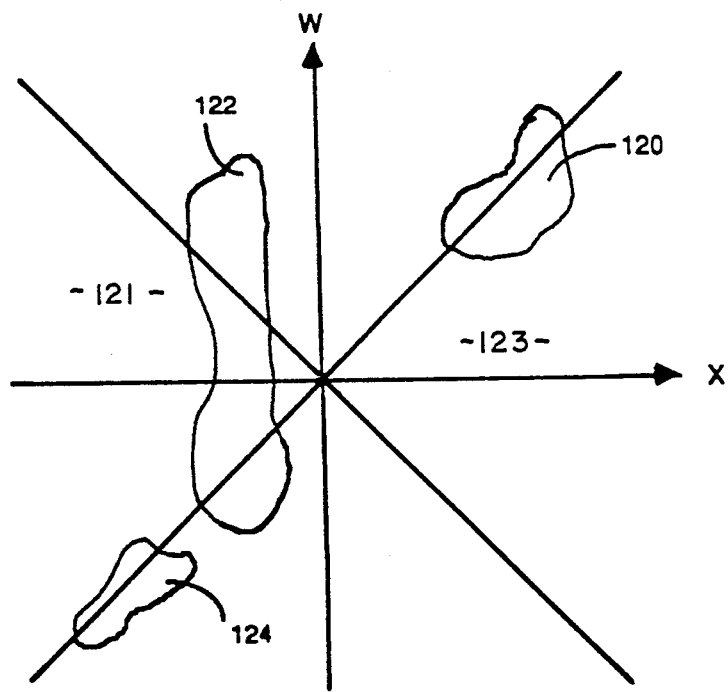
FIG. 8 is a further example of the present invention's method for clipping three dimensional images.

For those objects which intersect clipping planes such as objects 120, 122 or 124 in FIG. 8, the present invention identifies such intersection conditions and the display system then applies one of a variety of clipping algorithms such as mid-point subdivision or adaptive clip box to determine which portions of the object are to be displayed. It would be appreciated to one skilled in the art, that although the examples of FIG. 8 illustrate clip quadrants 121 and 123 as being enabled, that the present invention, as described herein, further operates in accordance with alternate clip quadrants enabled or disabled as illustrated in FIGS. 5a–5l.

Referring now to FIG. 9, the method of the present invention is further described with reference to generic methodology for the determination of whether all points comprising an object are visible, are hidden, or if the object at least partially intersects the W=0 space or an enabled clipping plane. For that portion of the coordinate system wherein W is greater than or equal to 0, and where the X Right bit is enabled, in those cases where W<X then X Right=1. Similarly, in those cases where the clipping in the X Left bit is enabled and X<−W, then X Left is set to 1. Alternatively, for that portion of the coordinate system wherein W<0, if the X Right clipping bit is disabled or W is less than or equal to X, then X Right=1, and if the X Left clipping bit is disabled or X<−W, then X Left is also set to equal 1.

As further set forth in FIG. 9, the method of the present invention is set forth in logical IF/THEN/ELSE statements. In accordance with the teachings of the present invention (see FIG. 6) the values of X Right, X Left, Y Top, Y Bottom, Z Back, and Z Front for each vertice of the object which may potentially be displayed is applied to the logical methodology illustrated in FIG. 9, and discussed herein. It will be noted that the logical methodology of the present invention as shown in FIG. 9 is applied such that the value of each of the clipping bits is determined for each point comprising the object. For purposes of this Specification where considering FIGS. 5 and 9, the words "on" denote a logical 1, and the word "off" denotes a logical 0.

Referring now to FIG. 10, once the logical value of each of the clipping bits is determined then the present invention proceeds to determine whether each point of the image is hidden, visible or if the image intersects a least one enabled clipping plane. The IF/THEN logic sequence of FIG. 10 is applied, as shown, and in the event the conditions are met such that all the points comprising the object are visible, then the object is rendered on display 34 by the CPU 24. If the method results in all the points being hidden in one dimension (X, Y or Z), then no object is rendered, and if the result is that the object intersects at least one enabled clipping plane then one of a variety of known clipping algorithms are employed to determine specifically which points of the object are visible and such points are then rendered.

IMPLEMENTATION

No particular programming language has been indicated for carrying out the various procedures described above. This is in part due to the fact that not all languages that might be mentioned are universally available. Each user of a particular computer will be aware of the language which is most suitable for his immediate purposes. In practice, it has proven useful to substantially implement the present invention in digital hardware, although the invention may also be implemented in software. Because the computers and the monitor systems which may be used in practicing the instant invention consist of many diverse elements, no detailed program listings nor hardware disclosures have been provided. It is considered that the operations and other procedures described above and illustrated in the accompanying drawings are sufficiently disclosed to permit one of ordinary skill to practice the instant invention or so much of it as is of use to him/her.

Thus, methods which are most advantageously used in conjunction with a digital computer to provide approved graphics capability have been disclosed. The present invention's unique methodology provides increased flexibility for the display system and eliminates the need to execute complex clipping algorithms in those cases where all of the points comprising the image are either visible or hidden.

While the present invention has been particularly described with reference to FIGS. 1–10, and with emphasis on certain computer systems, it would be understood that the figures are for illustration only and should not be taken as limitations upon the invention. In addition, it is clear that the methods of the present invention have utility in any application where graphic representations on a CRT where three dimensions are desired. It is contemplated that many changes and modifications may be made by one of ordinary skill in the art without departing from the spirit and scope of the invention as disclosed above.

I claim:

1. A method for clipping objects for display on a computer display system, said system including a display coupled to a central processing unit (CPU), said method comprising the steps of:

providing memory means coupled to said CPU and said display, for storing data representing points comprising an object, each of said points being described by coordinates in N dimensional space, said space being delineated by at least two quadrants;

selecting at least one said quadrant as a clipping quadrant;

defining clipping bits for each of said points comprising said object, wherein said clipping bits are defined by the variables X RIGHT, X LEFT, Y TOP, Y BOTTOM, Z BACK AND Z FRONT;

determining the value of each of said clipping bits, such that the value of each bit is a function of the location of said bit's respective point and of quadrant which has been selected;

displaying said object if the value of said clipping bits is equal to a first predefined value eliminating said object from display, if said bits are equal to a least one second predefined value;

whereby said object is clipped based on the value of said clipping bits and the particular quadrant which is enabled.

2. The method as defined by claim 1, wherein said space is delineated by 4×(N−1) quadrants.

3. The method as defined by claim 2, wherein the step of selecting a quadrant includes the step of enabling at least one of said quadrants identified as RIGHT, LEFT, TOP, BOTTOM, BACK and FRONT.

4. A method for clipping objects for display on a computer display system, said system including a display coupled to a central processing unit (CPU), said method comprising the steps of;

providing memory means coupled to said CPU and said display, for storing data representing points comprising an object, each of said points being described by coordinates in N dimensional space, said space being delineated by 4×(N−1) quadrants;

selecting at least one said quadrant as a clipping quadrant, wherein the step of selecting a quadrant includes the step of enabling at least one of said quadrants identified as RIGHT, LEFT, TOP, BOTTOM, BACK and FRONT;

defining clipping bits for each of said points comprising said object;

determining the value of each of said clipping bits, such that the value of each bit is a function of the location of said bit's respective point and of said quadrant which has been selected wherein said clipping bits are defined by the variables X RIGHT, X LEFT, Y TOP, Y BOTTOM, Z BACK and Z FRONT;

displaying said object if the value of said clipping bits is equal to a first predefined value, eliminating said object from display, if said bits are equal to at least one second predefined value wherein said clipping bit values are determined in accordance with the following logical conditions:

a. IF $W \geq 0$:
   THEN:
   IF CLIP RIGHT "ON" AND $W<X$
      THEN X RIGHT=1:
   IF CLIP LEFT "ON" AND $X<-W$
      THEN X LEFT=1
   ELSE:
   IF CLIP RIGHT "OFF" OR $W \leq X$
      THEN X RIGHT=1;
   IF CLIP LEFT "OFF" OR $X \leq -W$
      THEN X LEFT=1 b. IF $W \geq 0$:
   THEN:
   IF CLIP TOP "ON" AND $W<Y$
      Y TOP=1
   IF CLIP BOTTOM "ON" AND $Y<-W$
      Y BOTTOM=1
   ELSE:
   IF CLIP TOP "OFF" OR $W \leq Y$
      THEN Y TOP=1
   IF CLIP BOTTOM "OFF" OR $Y \leq -W$
      THEN Y BOTTOM=1 c. IF $W \geq 0$:
   THEN:
   IF CLIP BACK "ON" AND $W<Z$
      THEN Z BACK=1
   IF CLIP FRONT "ON" AND $Z<0$
      THEN Z FRONT=1
   ELSE:
   IF CLIP BACK "OFF" OR $W \leq Z$
      THEN Z BACK=1
   IF CLIP FRONT "OFF" OR $Z \leq 0$
      THEN Z FRONT=1;

whereby said object is clipped based on the value of said clipping bits and the particular quadrant which is enabled.

5. The method as defined by claim 4, wherein said object is visible and displayed if one of the following statements are true:
   a. IF ALL THE CLIPPING BITS ARE=0 FOR EVERY VERTICE;
   b. IF ALL THE CLIPPING BITS ARE=1 FOR EVERY VERTICE.

6. The method as defined by claim 5, wherein said object is hidden and not displayed if at least one of the following statements are true:
   a. IF ALL THE X LEFT BITS=0 AND ALL THE X RIGHT BITS=1 FOR EVERY VERTICE,
   b. IF ALL X LEFT BITS=1 AND ALL X RIGHT BITS=0 FOR EVERY VERTICE,
   c. IF ALL Y BOTTOM BITS=0 AND ALL Y TOP BITS=1 FOR EVERY VERTICE,
   d. IF ALL Y BOTTOM BITS=1 AND ALL Y TOP BITS=0 FOR EVERY VERTICE,
   e. IF ALL Z FRONT BITS=0 AND ALL Z BACK BITS=1 FOR EVERY VERTICE,
   f. IF ALL Z FRONT BITS=1 AND ALL Z BACK BITS=0 FOR EVERY VERTICE,
   g. IF NONE OF THE ABOVE (a-g) ARE TRUE THEN THE OBJECT INTERSECTS AT LEAST ONE CLIPPING PLANE.

* * * * *